US012679771B2

(12) United States Patent
Matsumoto et al.

(10) Patent No.: US 12,679,771 B2
(45) Date of Patent: Jul. 14, 2026

(54) CERAMIC SCRIBE SUBSTRATE, CERAMIC SUBSTRATE, METHOD FOR MANUFACTURING CERAMIC SCRIBE SUBSTRATE, METHOD FOR MANUFACTURING CERAMIC SUBSTRATE, METHOD FOR MANUFACTURING CERAMIC CIRCUIT BOARD, AND METHOD FOR MANUFACTURING SEMICONDUCTOR ELEMENT

(71) Applicant: Niterra Materials Co., Ltd., Yokohama (JP)

(72) Inventors: Yukihisa Matsumoto, Yokohama (JP); Naoto Hoshino, Yokohama (JP)

(73) Assignee: Niterra Materials, Ltd., Yokohama (JP)

( * ) Notice: Subject to any disclaimer, the term of this patent is extended or adjusted under 35 U.S.C. 154(b) by 459 days.

(21) Appl. No.: 18/333,697

(22) Filed: Jun. 13, 2023

(65) Prior Publication Data

US 2023/0326818 A1 Oct. 12, 2023

Related U.S. Application Data

(63) Continuation of application No. PCT/JP2021/046148, filed on Dec. 14, 2021.

(30) Foreign Application Priority Data

Dec. 16, 2020 (JP) ................................. 2020-208106

(51) Int. Cl.
*C04B 35/51* (2006.01)
*C04B 35/515* (2006.01)
(Continued)

(52) U.S. Cl.
CPC ............ *C04B 35/515* (2013.01); *C04B 35/58* (2013.01); *C04B 35/581* (2013.01); *C04B 35/584* (2013.01)

(58) Field of Classification Search
CPC ..... C04B 35/515; C04B 35/58; C04B 35/581; C04B 35/584
(Continued)

(56) References Cited

U.S. PATENT DOCUMENTS

2010/0258233 A1 * 10/2010 Tonomura ................ B23K 1/20
264/642
2011/0177292 A1 7/2011 Teshima et al.
(Continued)

FOREIGN PATENT DOCUMENTS

JP S62-174364 U 11/1987
JP 2001-267458 A 9/2001
(Continued)

OTHER PUBLICATIONS

JP2013175667A Machine Translation (Year: 2013).*
(Continued)

*Primary Examiner* — Betelhem Shewareged
(74) *Attorney, Agent, or Firm* — Muncy, Geissler, Olds & Lowe, P.C.

(57) ABSTRACT

A ceramic scribe substrate according to the present embodiment includes a continuous groove having multiple grooves connected to each other formed by fiber laser irradiation on a surface portion of a scribe line shaping a ceramic substrate. The continuous groove has a depth of more than 50 μm within a range of 0.15 times or more and 0.55 times or less a thickness of the ceramic substrate.

16 Claims, 3 Drawing Sheets

(51) Int. Cl.
    *C04B 35/58*         (2006.01)
    *C04B 35/581*       (2006.01)
    *C04B 35/584*       (2006.01)

(58) Field of Classification Search
    USPC .................................................... 428/32.71
    See application file for complete search history.

(56)                 References Cited

U.S. PATENT DOCUMENTS

| | | | |
|---|---|---|---|
| 2019/0031566 A1 | 1/2019 | Imamura et al. | |
| 2022/0037225 A1 | 2/2022 | Naba et al. | |
| 2022/0147723 A1* | 5/2022 | Yuasa .................... | G06K 1/126 |
| 2022/0161366 A1 | 5/2022 | Yuasa et al. | |
| 2023/0326818 A1* | 10/2023 | Matsumoto .......... | H10W 70/68 |
| | | | 438/126 |

FOREIGN PATENT DOCUMENTS

| | | |
|---|---|---|
| JP | 2002-076532 A | 3/2002 |
| JP | 2002-176119 A | 6/2002 |
| JP | 2006-036602 A | 2/2006 |
| JP | 2011-071374 A | 4/2011 |
| JP | 6399252 B2 | 10/2018 |
| JP | 6642146 B2 | 2/2020 |
| WO | 2009/154295 A1 | 12/2009 |
| WO | 2020/189526 A1 | 9/2020 |
| WO | 2020/209175 A1 | 10/2020 |
| WO | WO 2022131273 A1 | 6/2022 |

OTHER PUBLICATIONS

Extended European Search Report dated Oct. 31, 2024 (Application No. 21906635.4).

International Search Report and Written Opinion (Application No. PCT/JP2021/046148) dated Mar. 8, 2022.

Japanese Office Action (with English translation) dated Aug. 5, 2025 (Application No. 2022-570023).

Japanese Office Action for Japanese Patent Application 2024-205375 mailed on Mar. 17, 2026.

\* cited by examiner (NOTE : SOLDER IS NOT SHOWN)

CERAMIC SCRIBE SUBSTRATE, CERAMIC SUBSTRATE, METHOD FOR MANUFACTURING CERAMIC SCRIBE SUBSTRATE, METHOD FOR MANUFACTURING CERAMIC SUBSTRATE, METHOD FOR MANUFACTURING CERAMIC CIRCUIT BOARD, AND METHOD FOR MANUFACTURING SEMICONDUCTOR ELEMENT

CROSS-REFERENCE TO RELATED APPLICATION

This application is a Continuation application of No. PCT/JP2021/046148, filed on Dec. 14, 2021, and the PCT application is based upon and claims the benefit of priority from Japanese Patent Application No. 2020-208106, filed on Dec. 16, 2020, the entire contents of which are incorporated herein by reference.

FIELD

Embodiments generally relate to a ceramic scribe substrate, a ceramic substrate, a method for manufacturing a ceramic scribe substrate, a method for manufacturing a ceramic substrate, a method for manufacturing a ceramic circuit board, and a method for manufacturing a semiconductor element.

BACKGROUND

In recent years, with the development of semiconductor elements that require a large current, such as power electronics and next-generation power semiconductors, the demand for ceramic substrates with heat dissipation and electrical insulation has been increasing year by year. In particular, as the heat generated by the elements increases with miniaturization and performance improvement, the thickness of the ceramic substrates tends to decrease in order to efficiently dissipate heat.

On the other hand, ceramic substrates are manufactured in a larger size in order to reduce the manufacturing cost thereof. Among the ceramic substrates, a silicon nitride substrate with high strength, high toughness, and high heat dissipation is disclosed as a substrate in a size of 220 mm×220 mm×0.32 mm (Patent Document 1).

As a method of dividing a silicon nitride substrate, which has been manufactured in a large size in order to reduce the manufacturing cost, into pieces having a product size to be used, utilization of scribe lines formed by laser machining for forming multiple pieces is disclosed (Patent Document 2). According to Patent Document 2, microcracks in the silicon nitride substrate do not occur more than necessary upon division of the substrate involving the formation of multiple pieces thereof through laser machining, and scribe line machining for forming multiple pieces can also be performed easily at a low cost.

Meanwhile, problems caused by laser machining of a silicon nitride substrate with high strength and high toughness have become apparent because the substrate before the division is large and thin. For example, since the silicon nitride substrate has high strength, a large force is required to break it along scribe lines. Therefore, it is necessary to apply the laser deeply in the thickness direction of the silicon nitride substrate. However, because the silicon nitride substrate is thin, there is a huge risk that the substrate will be divided into pieces due to a force applied during the machining process after scribe line formation by the laser or during transportation. On the contrary, when the laser is applied shallowly in the thickness direction of the silicon nitride substrate, the substrate is less likely to be divided into pieces in the middle of the process, but a large force must be applied at the time of breaking, which causes a workload and chipping or cracking at the periphery may occur due to the large force applied.

In short, although it is possible to form a scribe line on a ceramic substrate by laser machining, it is necessary to control the method of forming the scribe line in order to improve the working efficiency after the scribe line formation and to prevent the occurrence of chipping and cracking.

In recent years, with the increase in the junction temperature of a power semiconductor chip, there has been a demand for higher reliability of a circuit board. Therefore, a high-strength and thin ceramic circuit board is demanded which has both heat dissipation and electrical insulation without impairing high reliability.

DETAILED DESCRIPTION

Hereinafter, embodiments of a ceramic scribe substrate, a ceramic substrate, a method for manufacturing a ceramic scribe substrate, a method for manufacturing a ceramic substrate, a method for manufacturing a ceramic circuit board, and a method for manufacturing a semiconductor element will be described in detail with reference to the drawings.

A ceramic scribe substrate according to the present embodiment includes a continuous groove having multiple grooves connected to each other formed by fiber laser irradiation on a surface portion of a scribe line shaping a ceramic substrate. The continuous groove has a depth of more than 50 μm within a range of 0.15 times or more and 0.55 times or less a thickness of the ceramic substrate.

A scribe line provided on the ceramic scribe substrate according to the embodiment is for shaping a ceramic substrate and refers to a scribe line before the ceramic substrate is divided and a scribe line mark after the division thereof (hereinafter referred to as "scribe line"). The scribe line on the ceramic scribe substrate according to the embodiment comprises a continuous groove having multiple grooves connected to each other on the surface portion formed by irradiation with a laser, for example, a fiber laser, the continuous groove having a depth of more than 50 μm and 0.15 times or more and 0.55 times or less the thickness of the ceramic substrate. Furthermore, it is preferable that a group of non-continuous grooves having multiple grooves but not connected to each other formed by fiber laser irradiation is further provided on the deeper portion of the scribe line. Hereinafter, a ceramic scribe substrate, a ceramic substrate, a method for manufacturing a ceramic scribe substrate, a method for manufacturing a ceramic substrate, a method for manufacturing a ceramic circuit board, and a method for manufacturing a semiconductor element according to the embodiments will be described in detail.

Figure 1:
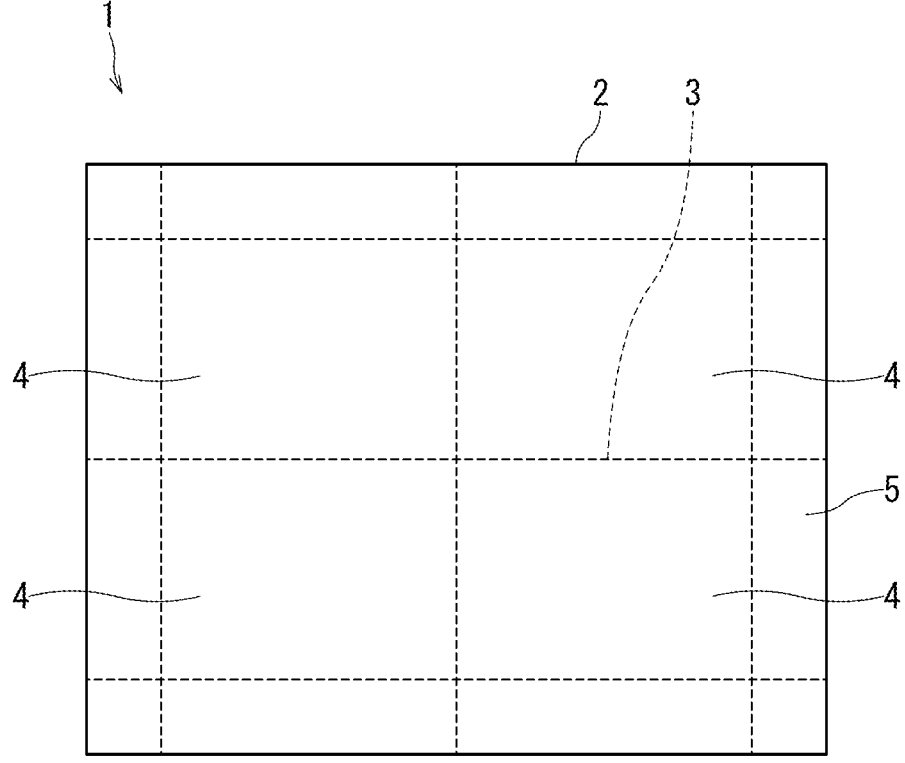
FIG. 1 is a top view showing an example of a ceramic scribe substrate according to an embodiment.

FIG. 1 is a top view of an example of the ceramic substrate according to the embodiment. Reference numeral 1 denotes a ceramic scribe substrate, 2 denotes a ceramic multi-piece substrate, 3 denotes a scribe line, 4 denotes an individual ceramic substrate to be used as a product, and 5 denotes a peripheral portion not to be used as a product.

The ceramic scribe substrate 1 includes a ceramic multi-piece substrate 2 from which multiple ceramic substrates can be obtained by division and a ceramic single-piece substrate (not shown) from which one ceramic substrate can be obtained by division. FIG. 1 shows an example of a ceramic multi-piece substrate 2 capable of forming multiple pieces of four ceramic substrates 4 in total, two substrates in the vertical and horizontal directions, respectively, which are formed by laser scribing along a total of six scribe lines 3, three lines in the vertical and horizontal directions, respectively. The ceramic scribe substrate 1 is not limited to such a ceramic multi-piece substrate 2 and may be a ceramic single-piece substrate having scribe lines capable of machining one ceramic substrate into a product shape or a ceramic multi-piece substrate having scribe lines capable of forming multiple pieces more than two in the vertical and horizontal directions, respectively. In addition, it is not necessary to form the scribe line 3 on the entire periphery of the ceramic substrate 4, and the scribe line 3 may be formed at one or more positions. In FIG. 1, the ceramic scribe substrate 1 has a rectangular shape in a plan view but may have a substantially polygonal shape.

When the ceramic scribe substrate 1 is a silicon nitride substrate, the three-point bending strength can be increased to 600 MPa or more, or even 700 MPa or more. The thermal conductivity may be 50 W/m·K or more, or even 80 W/m·K or more. When the ceramic scribe substrate 1 is an aluminum nitride substrate, the thermal conductivity can be increased to 170 W/m·K or more, or even 230 W/m·K or more. The three-point bending strength may be 350 MPa or more, or even 450 MPa or more. In particular, some silicon nitride and aluminum nitride substrates have both high strength and high thermal conductivity nowadays. When the ceramic scribe substrate 1 is a silicon nitride substrate, it is needless to say that the ceramic substrate 4 is also a silicon nitride substrate, and the three-point bending strength or the like of the ceramic scribe substrate 1 is synonymous with that of the ceramic substrate 4.

The ceramic scribe substrate 1 may be a single plate or may have a three-dimensional structure such as a multilayer structure.

The scribe line 3 is a laser scribe line machined by a fiber laser. The fiber laser is based on what is defined in JIS-Z 3001-5 (2013).

Figure 2:
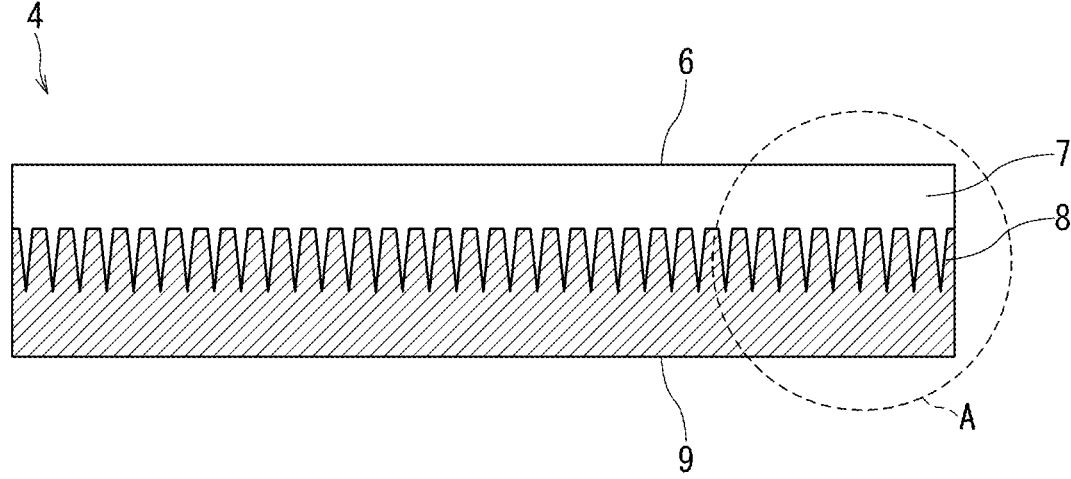
FIG. 2 is a cross-sectional view showing an example of a scribed cross-section of the ceramic scribe substrate according to the embodiment.

FIG. 2 shows an example of a scribe cross section of the ceramic scribe substrate 1 according to the embodiment. Reference numeral 6 denotes a laser irradiated surface (surface) which is on the laser irradiated side, 7 denotes a continuous groove having multiple grooves connected to each other on the surface portion and formed by laser irradiation, 8 denotes a group of non-continuous grooves (multiple recesses) having multiple grooves not connected to each other on the deeper portion and formed by laser irradiation, and 9 denotes a non-laser irradiated surface (rear surface) which is on the non-laser irradiated side opposite to the laser irradiated surface 6. The continuous groove 7 may be provided on the ceramic scribe substrate 1 in a manner that the continuous groove 7 is provided on the surface portion of at least one of the four side scribe lines 3 of the ceramic substrate 4 that is shaped on the ceramic scribe substrate 1.

Figure 3:
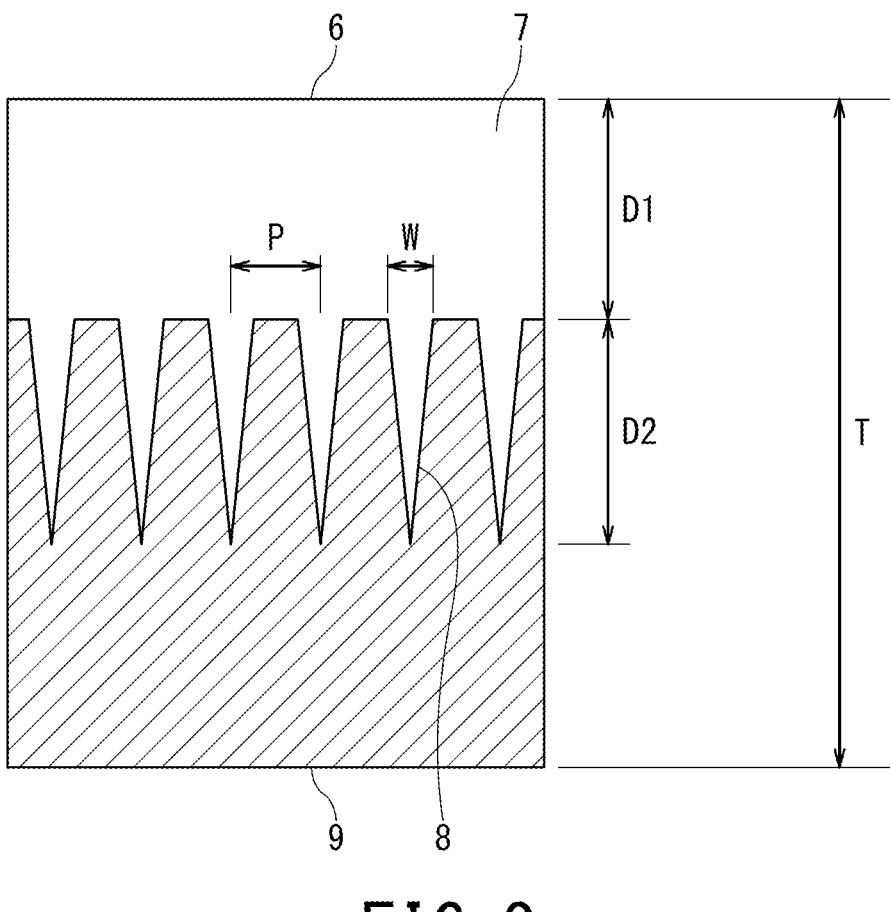
FIG. 3 is a partial cross-sectional view in which a portion A of FIG. 2 is enlarged.

FIG. 3 is an enlarged view of a cross section of a portion A in FIG. 2. T denotes the thickness of the ceramic scribe substrate 1, D1 denotes the distance from the surface of the ceramic scribe substrate 1 to the deepest portion of the continuous groove 7 (depth of the continuous groove 7), and D2 denotes the distance from the deepest portion of the continuous groove 7 to the deepest portion of the group of non-continuous grooves 8 (depth of the group of non-continuous grooves 8). The thickness of the ceramic scribe substrate 1 is synonymous with that of the ceramic substrate 4.

The depth D1 of the continuous groove 7 and the depth D2 of the group of non-continuous grooves 8 can be determined from the cross-section of the ceramic substrate 4. The cross-section of the ceramic substrate 4 after being divided along the scribe lines 3 is photographed by a microscope or a scanning electron microscope (SEM). In the enlarged photograph, a line parallel to the surface of the ceramic substrate 4 is drawn at the deepest portion of the continuous groove 7 (peak portion sandwiched by adjacent grooves of the group of non-continuous grooves 8), and the distance from the surface of the ceramic substrate 4 to the deepest portion is measured as the depth D1. Similarly, in the enlarged photograph, a line parallel to the surface of the ceramic substrate 4 as shown in the image is drawn at the deepest portion of the group of non-continuous grooves 8, and the distance from the deepest portion of the continuous groove 7 to the deepest portion of the group of non-continuous grooves 8 is measured as the depth D2. Accordingly, it is possible to easily obtain the depths D1 and D2. The depth D1 of the continuous groove 7 may be measured based on the position of one peak portion of the group of non-continuous grooves 8 or may be measured based on the positions of multiple, for example, ten peak portions apart from each other at equal intervals in the group of non-continuous grooves 8 and arithmetically averaged. In the case of the depth D2 of the group of non-continuous grooves 8, the depth of one groove in the group of non-continuous grooves 8 may be measured, or the depth of multiple, for example, ten grooves apart from each other at equal intervals in the group of non-continuous grooves 8 may be measured and arithmetically averaged.

The depth D1 of the continuous groove 7 from the laser irradiated surface 6 is more than 50 μm. The continuous groove 7 is formed in order to smoothly divide the high-strength ceramic scribe substrate 1 into pieces. When the continuous groove 7 has a depth of more than 50 μm, it becomes unnecessary to apply a large force at the time of dividing the ceramic scribe substrate 1. Furthermore, the depth of the continuous groove 7 is preferably more than 75 μm, and more preferably more than 100 μm.

On the other hand, the depth D1 of the continuous groove 7 is 0.15 times or more and 0.55 times or less the thickness T of the ceramic scribe substrate 1. If the depth D1 is less than 0.15 times the thickness T of the ceramic scribe substrate 1, a large force will be applied at the time of division. Therefore, cracks, cracking, and other defects are likely to occur at the divided points of the ceramic substrate 4 after the division. If the depth D1 exceeds 0.55 times the thickness T of the ceramic scribe substrate 1, the substrate will be divided into pieces even only by a small force applied during the subsequent process or transportation, thus making stable manufacturing impossible. Furthermore, the depth D1 of the continuous groove 7 is preferably 0.2 times or more and 0.5 times or less, and more preferably 0.25 times or more and 0.45 times or less the thickness T of the ceramic scribe substrate 1.

The depth D2 of the group of non-continuous grooves 8 formed on the deeper portion of the continuous groove 7 is 0 to 0.45 times or less the thickness T of the ceramic scribe substrate 1. If the depth D2 exceeds 0.45 times the thickness T of the ceramic scribe substrate 1, the substrate will be divided into pieces even only by a small force applied during the subsequent process or transportation, thus disenabling stable manufacturing. Furthermore, the depth D2 of the group of non-continuous grooves 8 is preferably 0.05 times or more and 0.4 times or less, and more preferably 0.1 times or more and 0.35 times or less the thickness T of the ceramic scribe substrate 1.

In FIG. 3, W denotes the width of openings of the group of non-continuous grooves 8 (hereinafter referred to as "groove opening width"), and P denotes the distance between adjacent grooves of the group of non-continuous grooves 8 (hereinafter referred to as "inter-groove distance"). In FIG. 3, the inter-groove distance P of the group of non-continuous grooves 8 is measured as the distance between the deepest portions of the adjacent grooves, but it can also be measured as the distance between the shallowest portions of the adjacent grooves.

The groove opening width W and the inter-groove distance P are determined by measuring the inter-groove distance P and the groove opening width W between adjacent grooves at, for example, 10 points where the depth D2 has been measured and then arithmetically averaging the measurements.

The inter-groove distance P of the group of non-continuous grooves 8 is 10 µm or more and 100 µm or less. If the inter-groove distance P is more than 100 µm, a large force will be applied at the time of division. Therefore, chipping, cracking, and other defects are likely to occur at the divided points of the ceramic substrate 4 after the division. If the inter-groove distance P is less than 10 µm, the substrate will be divided into pieces even only by a small force applied during the subsequent process or transportation, thus making stable manufacturing impossible. Furthermore, the inter-groove distance P of the group of non-continuous grooves 8 is preferably 20 µm or more and 90 µm or less, and more preferably 30 µm or more and 80 µm or less.

The groove opening width W of the group of non-continuous grooves 8 is 5 µm or more and 50 µm or less. If the groove opening width W is more than 50 µm, a large force will be applied at the time of division. Therefore, chipping, cracking, and other defects are likely to occur at the divided points of the ceramic substrate 4 after the division. If the groove opening width W is less than 5 µm, the substrate will be divided into pieces even only by a small force applied during the subsequent process or transportation, thus making stable manufacturing impossible. Furthermore, the groove opening width W of the group of non-continuous grooves 8 is preferably 10 µm or more and 45 µm or less, and more preferably 15 µm or more and 40 µm or less.

Moreover, it is suitable that the difference in brightness between a laser irradiation mark of the continuous groove 7 and the surface of the ceramic scribe substrate 1 (difference in groove brightness) is 5 or less. When no assist gas is used during laser machining, the surface of the continuous groove 7 turns black due to the residue of laser machining. Although the laser residue may be removed in a subsequent process, if it remains on the surface, the residue is likely to peel off. If the laser output power is increased without using assist gas, the processing speed can be increased. However, the damage on the surface of the continuous groove 7 will be greater. Therefore, the smaller the difference in brightness between the laser irradiation mark of the continuous groove 7 and the surface of the ceramic scribe substrate 1, the less damage is done to the ceramic substrate. Furthermore, the difference in brightness between the laser irradiation mark of the continuous groove 7 and the surface of the ceramic substrate is preferably 4 or less, and more preferably 3 or less.

The brightness is based on what is defined in JIS Z8721 (1993).

Figure 4:
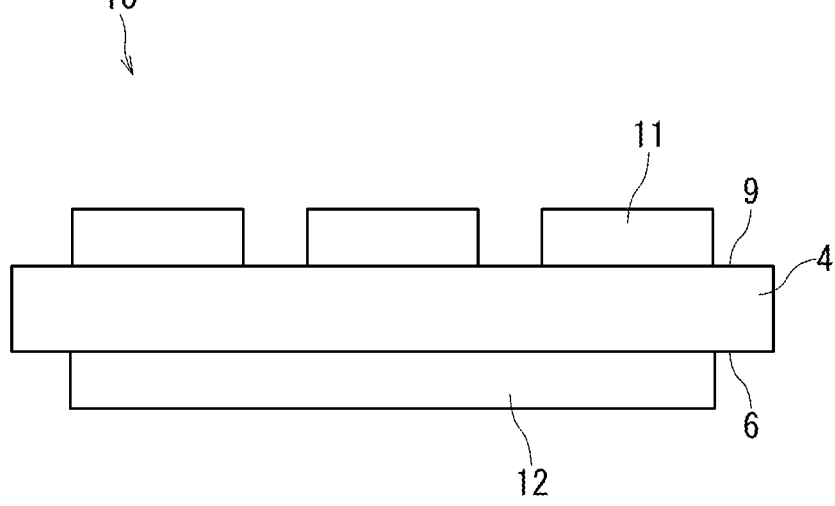
FIG. 4 is a diagram showing an example of the ceramic circuit board according to the embodiment.

It is possible to form a ceramic circuit board by bonding a metal circuit such as a metal plate to the ceramic substrate 4 after being divided by laser machining. FIG. 4 shows an example of a ceramic circuit board 10 according to the embodiment. In FIG. 4, reference numeral 4 denotes a ceramic substrate, 6 denotes a laser irradiated surface, 9 denotes a non-laser irradiated surface, 10 denotes a ceramic circuit board, 11 denotes a metal circuit, and 12 denotes a metal heat sink. The metal heat sink 12 is bonded to the laser irradiated surface 6 of the ceramic substrate 4. On the other hand, the metal circuit 11 is bonded to the non-laser irradiated surface 9 of the ceramic substrate 4.

Examples of the metal plate used for the metal circuit 11 include copper (Cu), copper-based alloy, and aluminum (Al). It is preferred that the ceramic substrate (product portion) 4 and the metal circuit 11 be bonded to each other via a bonding layer (not shown in the figure). It is also preferable to bond a metal heat sink to the ceramic substrate 4 via a bonding layer. The bonding layer between the ceramic substrate 4 and the metal circuit 11 is preferably formed with an active metal brazing material containing an active metal such as titanium (Ti). In addition to Ti, zirconium (Zr) may be used as the active metal. Examples of the active metal brazing material include a mixture containing one of silver (Ag) and Cu as a main component, in addition to Ti. The mixture contains Ti in an amount of 0.1 wt % or more and 10 wt % or less, Cu in an amount of 10 wt % or more and 60 wt % or less, and Ag as the balance. If necessary, one or more elements selected from indium (In), tin (Sn), Al, silicon (Si), carbon (C), and magnesium (Mg) may be added in an amount of 1 wt % or more and 15 wt % or less. In the active metal bonding method using active metal brazing material, an active metal brazing paste is applied onto the surface of the ceramic substrate 4, and then the metal circuit 11 is arranged thereon and heated at 600 degrees Celsius or more and 900 degrees Celsius or less for bonding. According to the active metal bonding method, the bonding strength between the ceramic substrate 4 and the metal circuit 11, which is a copper circuit board, may be 16 kN/m or more.

A metal thin film containing one selected from nickel (Ni), silver (Ag), and gold (Au) as the main component may be provided on the surface of the metal circuit 11. Examples of the metal thin film include a plating film and a sputtered film. The inclusion of the metal thin film can improve corrosion resistance and solder wettability.

In FIG. 4, the metal circuit 11 is formed on the non-laser irradiated surface (non-laser machined surface) 9 on the side opposite to the laser irradiated surface 6 where the scribe line 3 is formed, but it is also possible to form the metal circuit 11 on the laser irradiated surface 6 because the laser scribing of the present invention can alleviate stress with less damage caused during laser scribe formation. When the metal circuit 11 is formed on the laser irradiated surface 6, it is easy to align it for circuit formation using the scribe line 3. Conversely, if the metal heat sink 12 is formed on the laser irradiated surface 6, adhesion with a resin of the resin mold 16 can be improved.

Such a ceramic circuit board 10 is suitable for a semiconductor module 13 in which a semiconductor element is mounted on the metal circuit 11 via a bonding layer.

Figure 5:
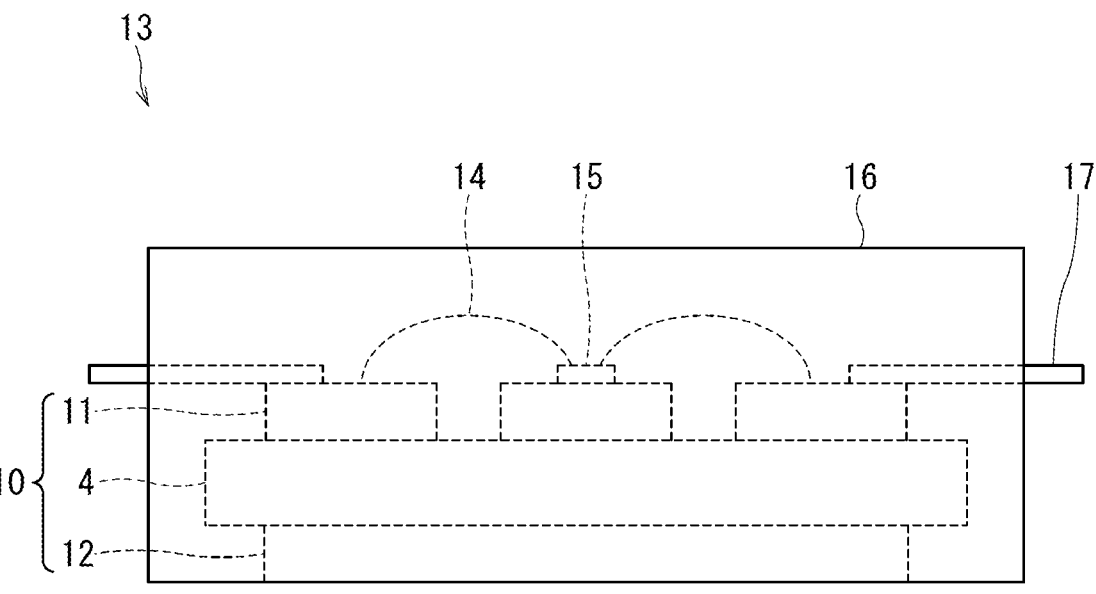
FIG. 5 is a side view showing an example of a ceramic circuit board integrated by resin molding according to the embodiment.

FIG. 5 shows an example of a semiconductor module (semiconductor device) according to the embodiment. In FIG. 5, reference numerical 10 denotes a ceramic circuit board, 13 denotes a semiconductor module, 14 denotes wire bonding, 15 denotes a semiconductor element, 16 denotes a resin mold, and 17 denotes a lead frame.

In FIG. 5, the semiconductor element 15 is bonded onto the metal circuit 11 of the ceramic circuit board 10 via a bonding layer (not shown). Similarly, the lead frame 17 is bonded via a bonding layer (not shown). Adjacent metal circuits 11 are electrically connected to each other by the wire bonding 14. In FIG. 5, the wire bonding 14 and the metal circuit 11 are bonded in addition to the semiconductor element 15. The ceramic circuit board 10 to which the wire bonding 14 is connected is integrated with the resin mold 16 to form the semiconductor module 13. The semiconductor module 13 is not limited to such a structure. For example, either wire bonding 14 or lead frame 17 may be used. Multiple semiconductor elements 15, wire bonding 14, and lead frames 17 may each be provided on the metal circuit 11.

The bonding layer for bonding the semiconductor element 15 and the lead frame 17 may be made of, for example, solder or brazing material. The solder is preferably a lead-free solder. The solder has a melting point of 450 degrees Celsius or less. The brazing material has a melting point exceeding 450 degrees Celsius. The brazing material having a melting point of 500 degrees Celsius or more is referred to as a high-temperature brazing material. The high-temperature brazing material may contain Ag as the main component.

When the entire ceramic circuit board 10 is sealed with the resin mold 16, it is desirable that the scribe surface is on the side (heat sink side) opposite to the metal circuit 11 as in the ceramic circuit board 10 shown in FIG. 4 because the group of non-continuous grooves 8 generated by laser scribing is less likely to be filled with resin and may generate voids. The scribe line 3 is formed on the side of the metal heat sink 12 to suppress the generation of voids that may hinder heat dissipation.

While the size of the semiconductor element 15 has been reduced, the amount of heat generated from a chip has been increasing. Therefore, it is important to improve heat dissipation in the ceramic circuit board 10 on which the semiconductor element 15 is mounted. In order to achieve high performance in the semiconductor module 13, the ceramic circuit board 10 is now equipped with multiple semiconductor elements 15 thereon. Even only one semiconductor element 15 has higher temperature than the intrinsic temperature of the element, the resistance changes to a temperature coefficient on the negative (minus) side. As a result, thermal runaway, in which electric power flows intensively, occurs, resulting in instantaneous destruction. Therefore, it is effective to improve heat dissipation. The semiconductor device 13 can be used in PCU, IGBT, and IPM modules for inverters of, for example, automobiles (including electric vehicles), railway vehicles, industrial machines, and air conditioners. Automobiles are increasingly becoming electric vehicles. Improvement in the reliability of the semiconductor device 13 directly leads to the safety of automobiles. The same applies to, for example, electric trains and industrial equipment.

Next, a laser scribing method for a silicon nitride substrate of the ceramic scribe substrate 1 according to the embodiment will be described. Methods for laser scribing the silicon nitride substrate are not particularly limited as long as they have the aforementioned configuration, and the following methods can be employed to obtain a high yield.

First, a silicon nitride substrate is prepared. In consideration of the heat dissipation of the entire ceramic circuit board 10 generated from the silicon nitride substrate, in particular, the silicon nitride substrate preferably has a thermal conductivity of 50 W/m·K or more and a three-point bending strength of 600 MPa or more.

When the metal circuit 11 on the side of the non-laser irradiated surface 9 and the metal heat sink 12 on the side of the laser irradiated surface 6 are electrically connected to each other, a silicon nitride substrate having a through hole is prepared. When the through hole is provided in the silicon nitride substrate, it may be provided in advance at the formation stage. Also, a processing for providing the through hole in a silicon nitride sintered body may be performed. The processing for providing the through hole is performed by, for example, laser machining similar to laser scribing or cutting. The cutting is performed by hall work with a drill or the like.

The silicon nitride substrate is set on a precision processing table of a fiber laser machine. The silicon nitride substrate is irradiated with a fiber laser to form scribe lines 3 consisting of a continuous groove 7 and a group of non-continuous grooves 8. At this time, the continuous groove 7 and group of non-continuous grooves 8 are formed with a predetermined size depending on the conditions of the fiber laser machine. In this case, after the continuous groove 7 is formed on the surface portion of the silicon nitride substrate as the ceramic scribe substrate 1 by a fiber laser, the group of non-continuous grooves 8 can be formed on the deeper portion by the fiber laser.

Next, one or more ceramic substrates 4 are manufactured by applying stress to the silicon nitride substrate as ceramic scribe substrate 1 and dividing the ceramic scribe substrate 1 along the scribe lines 3.

The metal circuit 11 is then bonded to the silicon nitride substrate as ceramic substrate 4.

The bonding between the silicon nitride substrate and the metal circuit 11 and the metal heat sink 12 are preferably performed by an active metal bonding method. In the active metal bonding method, an active metal brazing material mixed with an active metal such as Ti is used. Examples of the active metal brazing material include a mixture of Ti, Ag, and Cu. For example, the mixture contains Ti in an amount of 0.1 wt % or more and 10 wt % or less, Cu in an amount of 10 wt % or more and 60 wt % or less, and Ag as the balance. If necessary, one or more elements selected from In, Sn, Al, Si, C, and Mg may be added in an amount of 1 wt % or more and 15 wt % or less.

The active metal brazing material is made into a paste. The paste is a mixture of brazing material components and organic materials, but the brazing material components must be uniformly mixed because uneven distribution of the brazing material components leads to unstable brazing and causes bonding defects.

The active metal brazing paste is applied onto the ceramic substrate 4, and a copper plate is disposed thereon. Next, a bonding step is performed by heating it at 600 degrees Celsius or more and 900 degrees Celsius or less. The heating step is performed in a vacuum or non-oxidizing atmosphere if necessary, and is preferably performed at $1\times10^{-2}$ Pa or less in a vacuum. Examples of the non-oxidizing atmosphere include a nitrogen atmosphere and an argon atmosphere.

Oxidation of the bonding layer can be suppressed in a vacuum or non-oxidizing atmosphere, thereby improving the bonding strength.

The metal circuit 11 to be bonded may be either one that has been previously processed into a pattern shape for circuit formation or a single plate that has not yet been subjected to pattern processing. When a single plate is used, the plate is processed into a pattern shape by etching after being bonded. At this time, the metal circuit 11 is formed on a surface on the side opposite to a surface where the scribe line 3 is formed. Through this step, a silicon nitride metal circuit board can be manufactured as the ceramic circuit board 10.

The next step is to bond the semiconductor element 15 and other components. A bonding layer is provided at a place where the semiconductor element 15 is going to be bonded. The bonding layer is preferably made of solder or brazing material. The semiconductor element 15 is mounted on the bonding layer as provided. If necessary, the lead frame 17 is bonded via the bonding layer. In addition, if necessary, the wire bonding 14 is provided. The required number of the semiconductor element 15, lead frame 17, and wire bonding 14 are provided. The silicon nitride circuit board with the semiconductor element 15, lead frame 17, and wire bonding 14 is integrated with the resin mold 16 to seal the inside.

The above description assumes that the ceramic circuit board 10 is manufactured by bonding the metal circuit 11 or the like to the ceramic substrate 4 after division from the ceramic scribe substrate 1, but the present invention is not limited to this case. For example, the ceramic circuit board 10 may be manufactured by bonding the metal circuit 11 or the like to the ceramic substrate 4 before being divided from the ceramic scribe substrate, applying stress to the ceramic scribe substrate 1 bonded with the metal circuit 11 or the like, and dividing it along the scribe line 3 (results of Examples and Comparative Examples described later in Table 2), i.e., the order of the step of dividing the ceramic scribe substrate 1 and the step of bonding the metal circuit 11 or the like does not matter.

The laser scribing method for an aluminum nitride substrate of the ceramic scribe substrate 1 according to the embodiment will be described. First, the aluminum nitride substrate is prepared. In consideration of the heat dissipation of the entire circuit board, in particular, the aluminum nitride substrate preferably has a thermal conductivity of 170 W/m·K or more and a three-point bending strength of 350 MPa or more. Although methods for laser scribing the aluminum nitride substrate are not particularly limited as long as they have the aforementioned configuration, as the method for obtaining a high yield, process similar to that for manufacturing the above-described silicon nitride substrate and silicon nitride circuit board is adapted.

Examples 1 to 32 and Comparative Examples 1 to 20

As for the ceramic scribe substrate, a silicon nitride substrate (thermal conductivity: 90 W/m·K; three-point bending strength: 650 MPa) having a length of 40 mm×a width of 50 mm and a thickness of 0.32 mm and 0.50 mm was prepared, and an aluminum nitride substrate (thermal conductivity: 170 W/m·K; three-point bending strength: 400 MPa) having a length of 40 mm×a width of 50 mm and a thickness of 0.635 mm and 0.80 mm was also prepared.

Next, 101 ceramic scribe substrates were subjected to laser machining using a fiber laser with assist gas to form six lines thereof on the surface portion of the ceramic scribe substrates as shown in FIG. 1 under each set of conditions of Examples 1 to 32 and Comparative Examples 1 to 20. One of the ceramic scribe substrates after laser machining under each condition was then divided, and the vicinity of the central portion (a position about 10 mm from the end portion) of the cross-section of the ceramic substrate after the division was observed with SEM at a magnification of 100 times and photographed. A line was drawn on the surface of the ceramic substrate, the deepest portion of the continuous groove, and the deepest portion of the group of non-continuous grooves respectively to determine the depth D1 of the continuous groove and the depth D2 of the group of non-continuous grooves.

The inter-groove distance P and groove opening width W of the group of non-continuous grooves were determined by measuring the inter-groove distance P and groove opening width W between adjacent non-continuous grooves of the group at 10 consecutive points in the photograph and then arithmetically averaging the measurements. In Comparative Examples 7 and 16, machining was performed without using assist gas. Table 1 shows the measurement results of Examples and Comparative Examples (in Table 1, silicon nitride substrate is denoted as $Si_3N_4$ and aluminum nitride substrate as AlN).

TABLE 1

| Summary | Ceramic Substrate | T mm | D1 μm | D2 μm | D1/T | D2/T | P μm | W μm |
|---|---|---|---|---|---|---|---|---|
| Example 1 | $Si_3N_4$ | 0.32 | 55 | 0 | 0.17 | 0.00 | — | — |
| Example 2 | $Si_3N_4$ | 0.32 | 55 | 0 | 0.17 | 0.00 | — | — |
| Example 3 | $Si_3N_4$ | 0.32 | 55 | 140 | 0.17 | 0.44 | 12 | 6 |
| Example 4 | $Si_3N_4$ | 0.32 | 55 | 140 | 0.17 | 0.44 | 12 | 12 |
| Example 5 | $Si_3N_4$ | 0.32 | 55 | 140 | 0.17 | 0.44 | 98 | 6 |
| Example 6 | $Si_3N_4$ | 0.32 | 55 | 140 | 0.17 | 0.44 | 98 | 6 |
| Example 7 | $Si_3N_4$ | 0.32 | 55 | 140 | 0.17 | 0.44 | 98 | 48 |
| Example 8 | $Si_3N_4$ | 0.32 | 55 | 140 | 0.17 | 0.44 | 98 | 48 |
| Example 9 | $Si_3N_4$ | 0.32 | 170 | 0 | 0.53 | 0.00 | 12 | 6 |
| Example 10 | $Si_3N_4$ | 0.32 | 170 | 0 | 0.53 | 0.00 | 12 | 6 |
| Example 11 | $Si_3N_4$ | 0.32 | 170 | 140 | 0.53 | 0.44 | 12 | 6 |
| Example 12 | $Si_3N_4$ | 0.32 | 170 | 140 | 0.53 | 0.44 | 12 | 6 |
| Example 13 | $Si_3N_4$ | 0.32 | 170 | 140 | 0.53 | 0.44 | 12 | 12 |
| Example 14 | $Si_3N_4$ | 0.32 | 170 | 140 | 0.53 | 0.44 | 12 | 12 |
| Example 15 | $Si_3N_4$ | 0.32 | 170 | 140 | 0.53 | 0.44 | 98 | 6 |
| Example 16 | $Si_3N_4$ | 0.32 | 170 | 140 | 0.53 | 0.44 | 98 | 6 |
| Example 17 | $Si_3N_4$ | 0.32 | 170 | 140 | 0.53 | 0.44 | 98 | 48 |
| Example 18 | $Si_3N_4$ | 0.32 | 170 | 140 | 0.53 | 0.44 | 98 | 48 |
| Example 19 | $Si_3N_4$ | 0.50 | 80 | 0 | 0.16 | 0.00 | — | — |
| Example 20 | $Si_3N_4$ | 0.50 | 80 | 0 | 0.16 | 0.00 | — | — |
| Example 21 | $Si_3N_4$ | 0.50 | 270 | 220 | 0.54 | 0.44 | 12 | 6 |
| Example 22 | $Si_3N_4$ | 0.50 | 270 | 220 | 0.54 | 0.44 | 12 | 6 |
| Example 23 | $Si_3N_4$ | 0.50 | 270 | 220 | 0.54 | 0.44 | 12 | 12 |
| Example 24 | $Si_3N_4$ | 0.50 | 270 | 220 | 0.54 | 0.44 | 12 | 12 |
| Example 25 | $Si_3N_4$ | 0.50 | 270 | 220 | 0.54 | 0.44 | 98 | 6 |
| Example 26 | $Si_3N_4$ | 0.50 | 270 | 220 | 0.54 | 0.44 | 98 | 6 |
| Example 27 | $Si_3N_4$ | 0.50 | 270 | 220 | 0.54 | 0.44 | 98 | 48 |
| Example 28 | $Si_3N_4$ | 0.50 | 270 | 220 | 0.54 | 0.44 | 98 | 48 |
| Example 29 | AlN | 0.64 | 100 | 0 | 0.16 | 0.00 | — | — |
| Example 30 | AlN | 0.64 | 340 | 280 | 0.54 | 0.44 | 98 | 48 |
| Example 31 | AlN | 0.80 | 130 | 0 | 0.16 | 0.00 | — | — |
| Example 32 | AlN | 0.80 | 430 | 350 | 0.54 | 0.44 | 98 | 48 |
| Comparative Example 1 | $Si_3N_4$ | 0.32 | 45 | 0 | 0.14 | 0.00 | — | — |
| Comparative Example 2 | $Si_3N_4$ | 0.32 | 55 | 160 | 0.17 | 0.50 | — | — |
| Comparative Example3 | $Si_3N_4$ | 0.32 | 55 | 0 | 0.17 | 0.00 | 8 | 5 |
| Comparative Example 4 | $Si_3N_4$ | 0.32 | 55 | 140 | 0.17 | 0.44 | 10 | 4 |
| Comparative Example 5 | $Si_3N_4$ | 0.32 | 55 | 140 | 0.17 | 0.44 | 102 | 5 |

TABLE 1-continued

| Summary | Ceramic Substrate | T mm | D1 μm | D2 μm | D1/T | D2/T | P μm | W μm |
|---|---|---|---|---|---|---|---|---|
| Comparative Example 6 | Si₃N₄ | 0.32 | 55 | 140 | 0.17 | 0.44 | 98 | 52 |
| Comparative Example 7 | Si₃N₄ | 0.32 | 55 | 140 | 0.17 | 0.44 | 12 | 6 |
| Comparative Example 8 | Si₃N₄ | 0.50 | 45 | 0 | 0.09 | 0.00 | — | — |
| Comparative Example 9 | Si₃N₄ | 0.50 | 70 | 0 | 0.14 | 0.00 | — | — |
| Comparative Example 10 | Si₃N₄ | 0.50 | 280 | 0 | 0.56 | 0.00 | — | — |
| Comparative Example 11 | Si₃N₄ | 0.50 | 240 | 230 | 0.48 | 0.46 | 12 | 6 |
| Comparative Example 12 | Si₃N₄ | 0.50 | 80 | 140 | 0.16 | 0.28 | 8 | 5 |
| Comparative Example 13 | Si₃N₄ | 0.50 | 80 | 140 | 0.16 | 0.28 | 10 | 4 |
| Comparative Example 14 | Si₃N₄ | 0.50 | 80 | 140 | 0.16 | 0.28 | 102 | 5 |
| Comparative Example 15 | Si₃N₄ | 0.50 | 80 | 140 | 0.16 | 0.28 | 98 | 52 |
| Comparative Example 16 | Si₃N₄ | 0.50 | 80 | 140 | 0.16 | 0.28 | 12 | 6 |
| Comparative Example 17 | Si₃N₄ | 0.32 | 55 | 0 | 0.17 | 0.00 | — | — |
| Comparative Example 18 | Si₃N₄ | 0.32 | 55 | 140 | 0.17 | 0.44 | 12 | 6 |
| Comparative Example 19 | AlN | 0.64 | 90 | 0 | 0.14 | 0 | — | — |
| Comparative Example 20 | AlN | 0.80 | 430 | 300 | 0.54 | 0.38 | 120 | 60 |

As can be seen from Table 1, values of the depth of continuous groove D1, depth of group of non-continuous grooves D2, depth of continuous groove/substrate thickness (D1/T), depth of group of non-continuous grooves/substrate thickness (D2/T), inter-groove distance P, and groove opening width W of the ceramic scribe substrate were within the preferred range in Examples and Comparative Example 16. On the other hand, in Comparative Examples 1 to 15 and 17 to 20, those values were outside the preferred range.

Next, the brightness of the surface and the continuous groove of the ceramic scribe substrate, which was divided under each condition and subjected to SEM photograph observation, was measured by a micro-area spectrocolorimeter to obtain the difference.

Further, a copper plate was bonded to both surfaces of each of the ceramic scribe substrates before division produced in Examples and Comparative Examples by an active metal bonding method. As the copper plate, oxygen-free copper having a length of 40 mm, a width of 50 mm, and a thickness of 0.5 mm was used. The active metal brazing material used in the active metal bonding method was an active metal paste prepared by mixing 2 wt % of Ti, 10 wt % of Sn, 30 wt % of Cu and Ag as the balance with organic components to form a paste.

The active metal paste was printed and dried on the scribe surface of the ceramic scribe substrate, and then printed and dried on the non-laser irradiated surface, by using a semi-automatic screen printer that applies a screen mesh in the size of 320×320 mm with 250 mesh made of Stainless Steel V. At this time, the ceramic substrate that was cut from the scribe line by the pressure of the printer squeegee was deemed as a printing defect and did not proceed to the subsequent step.

The copper plate was disposed on each of the upper and lower surfaces of the ceramic substrate on which the paste had been printed and dried, sandwiched by a plate-shaped jig with a weight placed from above, and subjected to a heat bonding step at a bonding temperature of 810 degrees Celsius for a bonding time of 10 minutes in a vacuum (1×10⁻² Pa or less).

After heat bonding, the copper plates were etched to a circuit shape. The front copper plate was made into a circuit shape at three portions, and the back copper plate was also etched to provide a peripheral pullback.

The etched ceramic substrate was scribed by an automatic substrate dividing machine to obtain a ceramic circuit board. In other words, a metal circuit or the like was bonded to the ceramic substrate before division according to Examples and Comparative Examples, and stress was applied to the ceramic scribe substrate to which the metal circuit or the like was bonded, and then the ceramic scribe substrate was divided along the scribe line to manufacture a ceramic substrate circuit. The appearance of the ceramic circuit board was inspected, and the crack residue, chips or cracking and the like generated around the substrate were deemed as scribe defects, which did not proceed to the subsequent step.

A semiconductor element was mounted on the central circuit portion of each of the ceramic circuit boards manufactured from the ceramic scribe substrates according to Examples and Comparative Examples, which were then subjected to wire bonding, followed by integration with resin molding using a transfer molding method.

Next, with respect to the ceramic circuit boards manufactured from the ceramic scribe substrates according to Examples and Comparative Examples, the void fraction between the resin and the ceramic circuit board was evaluated by ultrasonic flaw detection (SAT) around the substrate on the circuit side where the semiconductor element was bonded. The void fraction (%) was defined as (total length of portions where the resin is not in close contact with the ceramic substrate and voids are present/length around the ceramic substrate)×100, and a void fraction of less than 95% was considered a resin peeling defect.

Table 2 shows results obtained from Examples and Comparative Examples. The scribe defect rate (%) and resin peeling defect (%) were calculated as the defect rate per 100 sheets of the product, except for the defect occurred in the previous steps.

TABLE 2

| Summary | Difference in Groove Brightness | Scribe Surface | Printing Defect Rate % | Scribe Defect Rate % | Resin Peeling defect Rate % |
|---|---|---|---|---|---|
| Example 1 | <1 | Non-Circuit Side | 0 | 2 | 0 |
| Example 2 | 5 | Non-Circuit Side | 0 | 1 | 1 |
| Example 3 | <1 | Non-Circuit Side | 0 | 0 | 0 |
| Example 4 | 5 | Non-Circuit Side | 0 | 0 | 1 |
| Example 5 | <1 | Non-Circuit Side | 0 | 0 | 0 |
| Example 6 | 5 | Non-Circuit Side | 0 | 0 | 0 |
| Example 7 | <1 | Non-Circuit Side | 0 | 0 | 0 |

TABLE 2-continued

| Summary | Difference in Groove Brightness | Scribe Surface | Printing Defect Rate % | Scribe Defect Rate % | Resin Peeling defect Rate % |
|---|---|---|---|---|---|
| Example 8 | 5 | Non-Circuit Side | 0 | 0 | 1 |
| Example 9 | <1 | Non-Circuit Side | 0 | 1 | 0 |
| Example 10 | 5 | Non-Circuit Side | 0 | 1 | 1 |
| Example 11 | <1 | Non-Circuit Side | 0 | 0 | 0 |
| Example 12 | 5 | Non-Circuit Side | 1 | 0 | 1 |
| Example 13 | <1 | Non-Circuit Side | 1 | 0 | 0 |
| Example 14 | 5 | Non-Circuit Side | 0 | 0 | 0 |
| Example 15 | <1 | Non-Circuit Side | 0 | 0 | 0 |
| Example 16 | 5 | Non-Circuit Side | 2 | 0 | 0 |
| Example 17 | <1 | Non-Circuit Side | 1 | 0 | 0 |
| Example 18 | 5 | Non-Circuit Side | 0 | 0 | 2 |
| Example 19 | <1 | Non-Circuit Side | 0 | 2 | 0 |
| Example 20 | 5 | Non-Circuit Side | 0 | 1 | 1 |
| Example 21 | <1 | Non-Circuit Side | 1 | 0 | 0 |
| Example 22 | 5 | Non-Circuit Side | 2 | 0 | 0 |
| Example 23 | <1 | Non-Circuit Side | 0 | 0 | 0 |
| Example 24 | 5 | Non-Circuit Side | 1 | 0 | 1 |
| Example 25 | <1 | Non-Circuit Side | 2 | 0 | 0 |
| Example 26 | 5 | Non-Circuit Side | 1 | 0 | 2 |
| Example 27 | <1 | Non-Circuit Side | 0 | 0 | 0 |
| Example 28 | 5 | Non-Circuit Side | 1 | 0 | 1 |
| Example 29 | <1 | Non-Circuit Side | 0 | 1 | 0 |
| Example 30 | 5 | Non-Circuit Side | 1 | 0 | 0 |
| Example 31 | <1 | Non-Circuit Side | 0 | 2 | 0 |
| Example 32 | 5 | Non-Circuit Side | 1 | 0 | 0 |

TABLE 2-continued

| Summary | Difference in Groove Brightness | Scribe Surface | Printing Defect Rate % | Scribe Defect Rate % | Resin Peeling defect Rate % |
|---|---|---|---|---|---|
| Comparative Example 1 | <1 | Non-Circuit Side | 0 | 9 | 0 |
| Comparative Example 2 | <1 | Non-Circuit Side | 7 | 0 | 0 |
| Comparative Example3 | <1 | Non-Circuit Side | 5 | 7 | 0 |
| Comparative Example 4 | <1 | Non-Circuit Side | 0 | 9 | 0 |
| Comparative Example 5 | <1 | Non-Circuit Side | 0 | 7 | 0 |
| Comparative Example 6 | <1 | Non-Circuit Side | 6 | 0 | 0 |
| Comparative Example 7 | 6 | Non-Circuit Side | 0 | 0 | 7 |
| Comparative Example 8 | <1 | Non-Circuit Side | 0 | 10 | 0 |
| Comparative Example 9 | <1 | Non-Circuit Side | 0 | 8 | 0 |
| Comparative Example 10 | <1 | Non-Circuit Side | 5 | 0 | 0 |
| Comparative Example 11 | <1 | Non-Circuit Side | 8 | 0 | 0 |
| Comparative Example 12 | <1 | Non-Circuit Side | 0 | 5 | 0 |
| Comparative Example 13 | <1 | Non-Circuit Side | 0 | 7 | 0 |
| Comparative Example 14 | <1 | Non-Circuit Side | 0 | 5 | 0 |
| Comparative Example 15 | <1 | Non-Circuit Side | 5 | 0 | 0 |
| Comparative Example 16 | 6 | Non-Circuit Side | 0 | 0 | 8 |
| Comparative Example 17 | <1 | Circuit Side | 0 | 0 | 6 |
| Comparative Example 18 | <1 | Circuit Side | 0 | 0 | 7 |
| Comparative Example 19 | <1 | Non-Circuit Side | 0 | 7 | 0 |
| Comparative Example 20 | 6 | Circuit Side | 7 | 9 | 9 |

As can be seen from Table 2, the difference in groove brightness and the orientation of the scribe surface of the ceramic circuit boards manufactured from the ceramic scribe substrates according to Examples and Comparative Examples 1 to 6, 8 to 15, and 19 were in the preferred range, while the ceramic circuit boards manufactured from the ceramic scribe substrates according to Comparative Examples 7, 16 to 18, and 20 were outside the preferred range.

The ceramic circuit boards manufactured from the ceramic scribe substrates according to Examples did not have paste printing defects or had a small defect rate because the laser scribes were formed to resist the pressure applied to the surface of the ceramic scribe substrate during paste printing. In contrast, Comparative Examples had many cracking defects because the laser scribes were formed too far to resist the pressure during paste printing.

The ceramic circuit boards manufactured from the ceramic scribe substrates according to Examples did not have any scribe defects or had a small defect rate because the laser scribes that could divide the ceramic scribe substrates with a constant load of the scribes were formed. In contrast, Comparative Examples had many scribe defects because the laser scribes were not sufficiently formed. In this case, the substrates could not be divided along the lines with a constant load of the scribes, which caused chipping and cracking defects.

The ceramic circuit board manufactured from the ceramic scribe substrate according to Examples did not have a resin peeling defect or had a small defect rate because there were no residues caused by laser machining due to laser scribing and no trace of continuous grooves and groups of non-continuous grooves in the resin-molded portion, and thus no unbonded portions caused by laser residues and no voids caused by either traces of continuous grooves or groups of non-continuous grooves occurred. In contrast, the ceramic circuit boards manufactured from the ceramic scribe substrates according to Comparative Examples had many resin peeling defects because unbonded portions caused by laser residues and voids caused by continuous grooves and groups of non-continuous grooves occurred.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A ceramic scribe substrate comprising a continuous groove having multiple grooves connected to each other formed by fiber laser irradiation on a surface portion of a scribe line shaping a ceramic substrate, wherein
the continuous groove has a depth of more than 50 μm within a range of 0.15 times or more and 0.55 times or less a thickness of the ceramic substrate.

2. The ceramic scribe substrate according to claim 1, comprising a group of non-continuous grooves having multiple grooves not connected to each other formed by fiber laser irradiation on a deeper portion of the scribe line.

3. The ceramic scribe substrate according to claim 2, wherein the group of non-continuous grooves has a depth greater than 0 and 0.45 times or less the thickness of the ceramic substrate.

4. The ceramic scribe substrate according to claim 2, wherein the group of non-continuous grooves has a distance between adjacent grooves of 10 μm or more and 100 μm or less.

5. The ceramic scribe substrate according to claim 2, wherein each groove of the group of non-continuous grooves has a width of 5 μm or more and 50 μm or less.

6. The ceramic scribe substrate according to claim 1, wherein a difference in brightness between a laser irradiation mark of the continuous groove and a surface of the ceramic substrate is 5 or less.

7. The ceramic scribe substrate according to claim 1, wherein the ceramic substrate is a silicon nitride substrate or an aluminum nitride substrate.

8. A ceramic substrate comprising a continuous groove having multiple grooves connected to each other formed by fiber laser irradiation on a surface portion of at least one of four side scribe lines, wherein
the continuous groove has a depth of more than 50 μm within a range of 0.15 times or more and 0.55 times or less a thickness of the ceramic substrate.

9. The ceramic substrate according to claim 8, wherein the ceramic substrate comprises a group of non-continuous grooves having multiple grooves not connected to each other formed by fiber laser irradiation on a deeper portion of the scribe line.

10. A method for manufacturing a ceramic scribe substrate, comprising forming the continuous groove on a surface portion of a substrate by a fiber laser, followed by forming a group of non-continuous grooves having multiple grooves not connected to each other on the deeper portion by a fiber laser so as to generate the ceramic scribe substrate according to claim 1.

11. A method for manufacturing a ceramic substrate, comprising applying a stress to the ceramic scribe substrate according to claim 1 to divide the ceramic scribe substrate along the scribe line, thereby manufacturing a ceramic substrate.

12. A method for manufacturing a ceramic circuit board, comprising the method for manufacturing a ceramic substrate according to claim 11, wherein
a metal circuit is bonded to the ceramic substrate to manufacture a ceramic circuit board.

13. A method for manufacturing a ceramic circuit board, comprising:
bonding a metal circuit to the ceramic scribe substrate according to claim 1; and
applying a stress to the ceramic scribe substrate to which the metal circuit is bonded to divide the ceramic scribe substrate along the scribe line, thereby manufacturing a ceramic circuit board.

14. The method for manufacturing a ceramic circuit board according to claim 12, comprising bonding the metal circuit to a surface of the ceramic substrate opposite to a surface where the scribe line is formed.

15. A method for manufacturing a semiconductor device, comprising the method for manufacturing a ceramic circuit board according to claim 12, wherein
a semiconductor element is mounted on the ceramic circuit board to manufacture a semiconductor device.

16. The method for manufacturing a semiconductor device according to claim 15, wherein the ceramic substrate, the metal circuit, and the semiconductor element is integrated by resin molding.

* * * * *